United States Patent
Muddiman

[11] Patent Number: 5,755,249
[45] Date of Patent: May 26, 1998

[54] FLUID FLOW MONITOR

[75] Inventor: Scott Muddiman, Burlington, Canada

[73] Assignee: Process Equipment Limited, Burlington, Canada

[21] Appl. No.: 715,120

[22] Filed: Sep. 17, 1996

Related U.S. Application Data

[63] Continuation-in-part of Ser. No. 404,436, Mar. 15, 1995, Pat. No. 5,601,109.

[51] Int. Cl.$^6$ .................. F16K 17/40; F16K 37/00
[52] U.S. Cl. .................. 137/68.18; 200/61.08; 200/81.9 R; 340/626
[58] Field of Search .................. 137/68.18, 68.19; 200/61.08, 81.9 R, 83 D, 83 Q; 340/611, 626

[56] References Cited

U.S. PATENT DOCUMENTS

| | | | |
|---|---|---|---|
| 3,770,918 | 11/1973 | Fortmann | 137/68.18 X |
| 3,968,339 | 7/1976 | Heaton | 200/83 Q X |
| 4,342,988 | 8/1982 | Thompson et al. | 137/68.18 X |
| 4,408,194 | 10/1983 | Thompson | 137/68.18 X |
| 4,951,697 | 8/1990 | Fritts | 137/68.19 X |
| 4,978,947 | 12/1990 | Finnegan | 137/68.19 X |
| 5,155,471 | 10/1992 | Ellis et al. | 137/68.18 X |
| 5,313,194 | 5/1994 | Varos | 137/68.19 X |

FOREIGN PATENT DOCUMENTS

| 1182738 | 1/1964 | Germany | 200/61.08 |
|---|---|---|---|

OTHER PUBLICATIONS

BS&B Safety Systems, Catalog 77-1009A, Detec-SafAlarm system, Date Unknown.

Elfab-Hughes-Burst Disc Detector, brochure, Date Unknown.

*Primary Examiner*—John Rivell
*Attorney, Agent, or Firm*—Ian Fincham; McFadden, Fincham

[57] ABSTRACT

A fluid flow monitor has coaxial conductive annular supports separated by an insulating gasket and connected by a conductive member. One support has a lesser external diameter and a smaller internal diameter than the other to reduce the chance of accidental short circuiting. Wires are attached to each support, a third wire supplies a floating ground to ensure monitor tripping is not caused by a ground fault. Tabs on the inner perimeter of the supports may mount the conductive member.

11 Claims, 5 Drawing Sheets

FLUID FLOW MONITOR

This application is a continuation-in-part of U.S. patent application Ser. No. 08/404,436 filed Mar. 15, 1995 now U.S. Pat. No. 5,601,109.

FIELD OF THE INVENTION

This invention relates to fluid flow monitors, and particularly, but not exclusively to rupture disc monitors, that is monitors which will give some form of indication that a rupture disc has ruptured or burst. In particular the present invention relates to a monitor in which the active member is readily replaced without the holding structure being replaced.

BACKGROUND OF THE INVENTION

It has been proposed to monitor rupture discs so that an indication of rupture can be obtained. Rupture discs are frequently installed under relief valves to prevent pollution by leakage and to ensure correct operation when needed. Unfortunately, when a pressure surge results in a relief valve opening, the rupture disc below it is destroyed. After the valve recloses, it often leaks, with a resultant pollution problem, particularly in chemical plants and oil refineries. Also flow monitors can be used to detect, and indicate flow downstream of a valve which is supposed to be closed.

Various forms of monitor or indicator exist. One example is a light beam monitor in which flow interrupts the light beam, indicating rupture. Another form uses paddles which are deflected by flow such as through a ruptured disc. These paddles are damaged by sudden flows and need replacing. In other forms electrical paths are formed which are broken on flow of a fluid. Electrical feed members or items, are often supplied as part of a rupture disc assembly itself and is at least difficult to retrofit to existing installations.

The various forms of monitors or indicators suffer from one or more disadvantages. The actual installation can be expensive. The associated equipment, for example, the light beam monitor is expensive and requires some place to position the light producing and beam monitoring apparatus. Replacement can often be difficult and may require replacement of an entire unit, which is inefficient.

It is a principal object of the invention to provide an improved fluid flow monitor. It is a subsidiary object to provide paired annular coaxial electrically conductive supports one having a smaller external diameter and a larger internal diameter, than the other. It is a further subsidiary object to provide a floating ground to check for ground fault tripping of the monitor. It is a further subsidiary object to provide tabs projecting inward from the supports to mount connections thereon.

SUMMARY OF THE INVENTION

One object of the present invention is to provide an improved fluid flow monitor.

The invention is, in one aspect, directed to a fluid monitor, which has first and second electrically conductive annular support members in axial alignment, and an electrically insulating annular member between the support members. There are first connecting means on the first support member and second connecting means on the second support member, the first and second connecting means are diametrically spaced on the support members. There is an electrically conductive member extending between the first and second connecting means and releasably connected thereto. Electrical connection means are mounted on each of the support members.

A further object of the present invention is to provide a fluid monitor, comprising:
first and second electrically conductive annular support members in axial alignment;
an electrically insulating annular member between the support members;
a first connecting means on the first support member and a second connecting means on the second support member, the first and second connecting means being diametrically spaced on the support members;
an electrically conductive member extending between the first and second connecting means and releasably connected thereto;
electrical connection means on each of the support members; and
a flexible liner means positioned adjacent the electrically conductive member, the liner means for disengaging the electrically conductive member upon extension of the flexible liner means under fluid pressure.

Yet another object of the present invention is to provide, in combination, a rupture disc assembly having monitoring means, comprising:
rupture disc assembly means;
means for mounting the rupture disc assembly means to a pipeline; and
monitor means of claim 1 coaxially mounted with the rupture disc assembly means.

The support members may comprise electrically conductive material and are preferably metal. Preferably the first connecting means comprises two slots extending through the first support member. The slots are parallel and extend tangentially. One end of the conductive member extends through a first slot closest to the outer perimeter of the first support members and then extending through a second slot closest to the inner perimeter of the first support member. Preferably the second connecting means comprises strap means attached to a surface of the second support member forming a thin slot between the strap and the surface, and one end of the conductive member is positioned within the slot. When inward projecting tabs are present the first and second projecting means are attached thereto. Preferably paired annular gaskets are axially aligned with and exterior to the support members.

More preferably a rupture disc assembly having monitoring means, is provided having rupture disc assembly means, means to mount the rupture disc assembly means to a pipeline, and monitor means as described above coaxially mounted with the rupture disc assembly means.

In a further embodiment, the support members and the insulating members or gaskets may be fixedly secured together in a discontinuous manner at a plurality of points. This has advantages over adhesively fixed arrangements where the assembly may be used in an environment where an adhesively engaged assembly would possibly melt or otherwise defective. Where adhesive engagement is not advantageous, the use of the rivets significantly reduces nuisance alarming of the arrangement.

In one possible embodiment, the discontinuous point connection of the members may be facilitated by rivets. It will be understood that the rivets will comprise a material which is nonelectroconductive so as not to interfere with the electrically conductive members in the assembly. As a further advantage the rivet system permits the replacement of the insulating members or gaskets when they become worn.

As a further attendant advantage, the arrangement according to a further embodiment of the present invention may include a flexible liner for positioning adjacent the electrically conductive member. The use of the liner is convenient, since this can be used in combination with a conventional rupture disc. This system has utility in terms of covering pin hole leaks which can occur in the rupture disc. The pin hole leaks are generally the result of corrosion. The holes do not cause enough flow to trip the electrically conductive member nor is it enough to burst the rupture disc. By making use of the flexible liner, when significant pressure builds up, such pressure will be sufficient to not only rupture the rupture disc, but also the liner.

A further aspect of the invention is to provide a fluid monitor, comprising:

first and second electrically conductive annular support members in axial alignment;

an electrically insulating annular member between the support members;

a first connecting means on the first support member and a second connecting means on the second support member, the first and second connecting means being diametrically spaced on the support members;

an electrically conductive member extending between the first and second connecting means and releasably connected thereto;

electrical connection means on each of the support members; and a flexible liner means positioned adjacent the electrically conductive member, the liner means adapted for disengaging the electrically conductive member upon extension of the flexible liner means under fluid pressure.

Having thus generally described the invention, reference will now be made to the accompanying drawings, illustrating preferred embodiments.

BRIEF DESCRIPTION OF THE DRAWINGS

Similar numerals in the drawings denote similar elements.

DETAILED DESCRIPTION OF THE PREFERRED EMBODIMENTS

Figure 1:
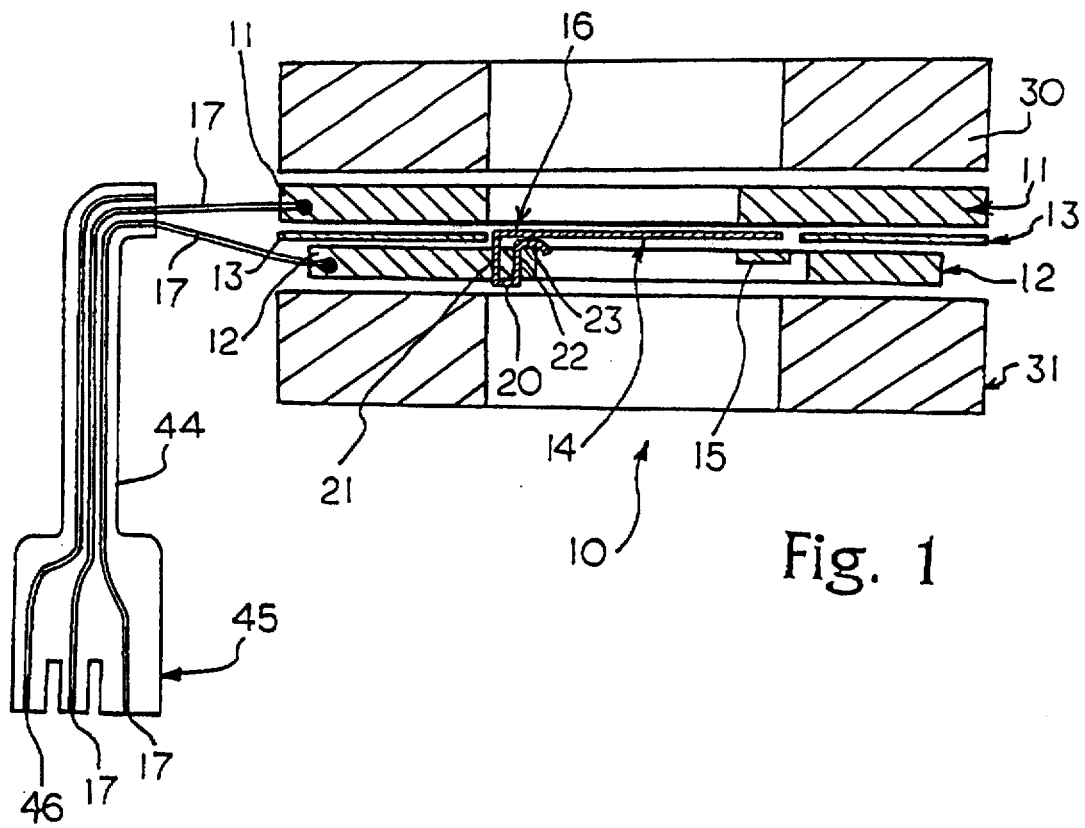
FIG. 1 shows a side sectional view of an embodiment invention overall view of an embodiment of the invention.

In the drawings, the numeral 10 indicates a fluid flow monitor or indicator, which comprises two annular support members, an upper 11, and a lower 12, separated by an insulator 13, as exemplified support members are electrically conducting either being of electrically conductive material such as metal or comprising electrically conductive material, such as metal, preferably steel while insulator 13 is of electrically insulating material. Electrically conductive member 14 extends diametrically from first connecting means 15 attached to upper support 11 to second connecting means 16 attached to lower support 12. Terminals 17 connect support members 11 and 12 through cable 44 to three pin plug 45, floating ground fault 46 provides a check to allow the monitor to distinguish between the monitor being tripped by fluid flow or a ground fault within the system. Lower support member 12 has a smaller outside diameter and a larger inside diameter than upper support member 11, which reduces the chance of the two support members shorting to each other.

Figure 2:
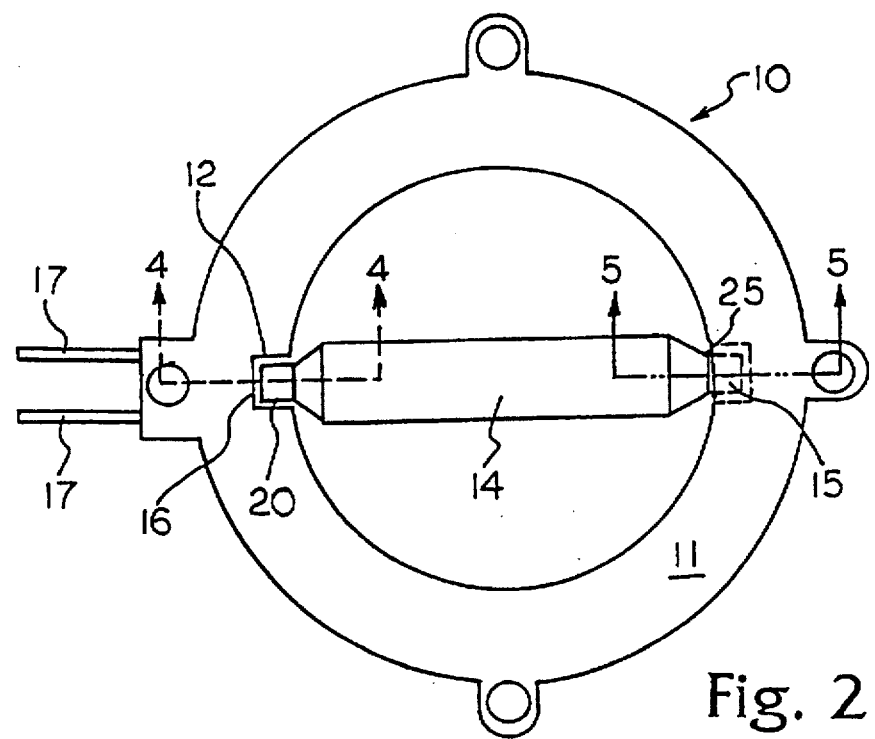
FIG. 2 shows a top view of the embodiment of FIG. 1.
Figure 3:
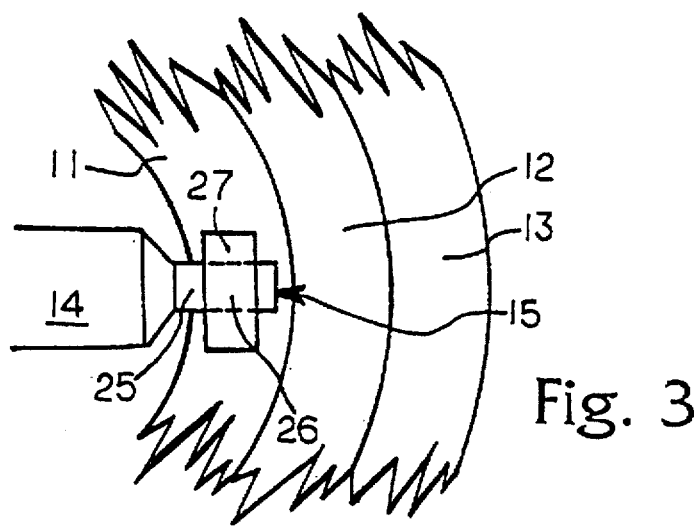
FIG. 3 is an enlarged bottom view of a connecting means of the embodiment of FIG. 1.
Figure 4:
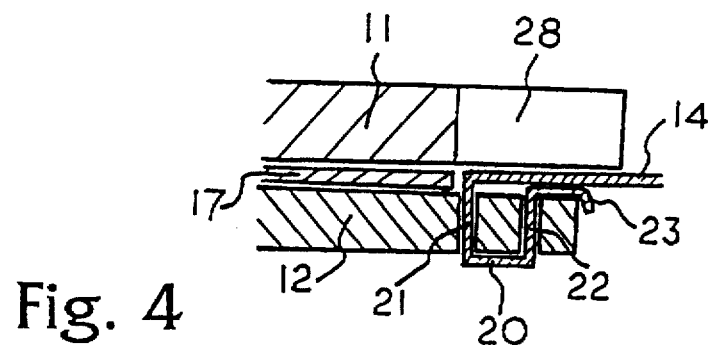
FIG. 4 is a side view of another connecting means of the embodiment of FIG. 1.
Figure 5:
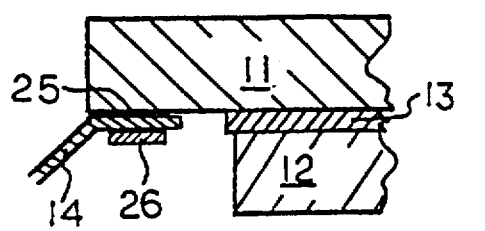
FIG. 5 is a side view of the connecting means of FIG. 3.

As shown in FIG. 2, connecting means 15 and 16 are diametrically positioned to receive narrowed ends 20 and 25 of conductive member 14, while the central broad portion maximizes the area exposed to fluid flow.

Narrowed end 25 forms together with strap 26, which is spot welded at its ends 27 to upper support member 11, the breaking connection, which is pulled apart by the fluid flow. A close sliding fit is shown between end 25 of conductive member 14, which would allow reinsertion after the connection is broken.

Narrowed end 20 is located below recess 28 cut into the inner perimeter of upper support member 11, end 20 passes downward through outer slot 21 in lower support member 12 along the bottom of the support member then up inner slot 22, and then bent over at 23, to form the fixed connection.

As would be understood by those skilled in the art other means can be used for the fixed connection such as screws, soldering, and welding. Similarly slots of various types can be used for the breaking connection.

Tabs projecting inward from the inner perimeters of the support members may also be used to attach narrowed ends 20 and 25 to the support members.

When monitor 10 is inserted into the pipework its associated gaskets 30 and 31 are positioned on either side of the monitor assembly. The gaskets may electrically insulate support members 11 and 12, when they are of electrically conducting material, from the pipework, or if the support members are of non-conductive material with conducting surfaces, then the gaskets act only as sealing members.

Typically monitor 10 is installed downstream of a rupture disc remote from the fluid being retained. When the disc ruptures fluid flow distorts member 14 pulling end 25 out from contact with strap 26, breaking the electrical connection, and creating a signal at terminals 17. This signal can be a stoppage of current flow, or some other indication of loss of connection.

Figure 6:
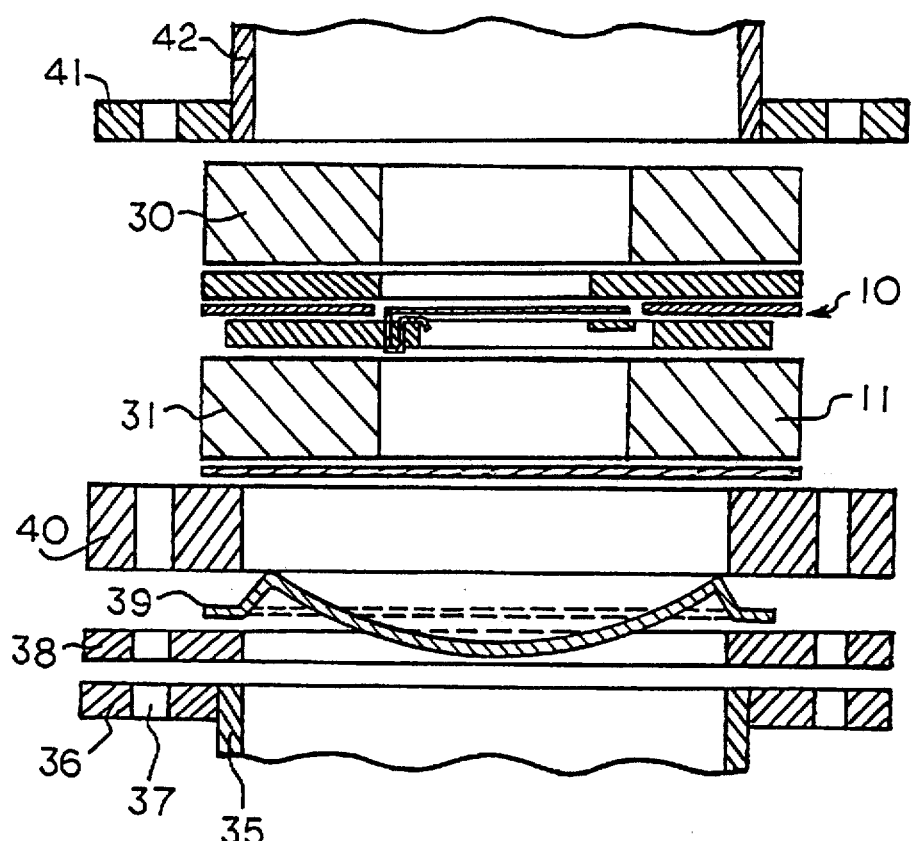
FIG. 6 is an exploded vertical cross section through a rupture disc assembly incorporating the embodiment of FIG. 1.

Such an arrangement is indicated in FIG. 6, where pipe 35 has flange 36 having a plurality of holes 37, as those skilled in the art would appreciate considerable variation in flange and pipe structure is known. In sequence from the flange and pipe is an assembly including annular ring 38, rupture disc 39 and further annular ring 40. Then comes monitor assembly 10 including gaskets 30 and 31, beyond which is flange 41 and pipe 42, as those skilled in the art would appreciate considerable variation in flange and pipe structure is known. As shown flanges 36 and 41 are welded to pipes 35 and 42. Bolts, not shown, extend through annular rings 38 and 40 and flanges 36 and 41. Monitor assembly 10 and its associated gaskets 30 and 31 are dimensioned so the outside diameter just fits within the bolts, which clamp the monitor assembly and the rupture disc assembly in a fluid tight manner, the bolts positioning the monitor assembly.

Normally pipe 35 is connected to a pressurized process pipeline and normally pipe 42 is connected to a relief valve, as those skilled in the art would appreciate considerable variation is known. As shown rupture disc 39 is of the reverse buckling type, again as those skilled in the art would appreciate considerable variation in rupture disc type is known.

After shut-off of the fluid flow in the system the rupture disc assembly is opened for installation of a new rupture disc. At the same time member 14 can be moved to its correct position and end 25 replaced in contact with strap 26. When member 14 is damaged beyond reuse by fluid flow or rupture or otherwise, then a new member is easily inserted, which is done by pushing end 20 down through slot 21, then up through slot 22, and bent over at 23, the other end 25 is then pushed under strap 26.

A fluid flow monitor as shown in FIGS. 1-5 and described above can also be installed in pipework downstream of a valve in which monitoring of an unintended opening is desired. Use of a monitor fluid flow can be immediately detected, should the valve be left open after servicing for example, or be opened by error.

The monitor is very easy to install and is an inexpensive device. It can be readily retrofitted to existing pipework and rupture disc assemblies whether or not there is already some form of monitor.

Figure 7:
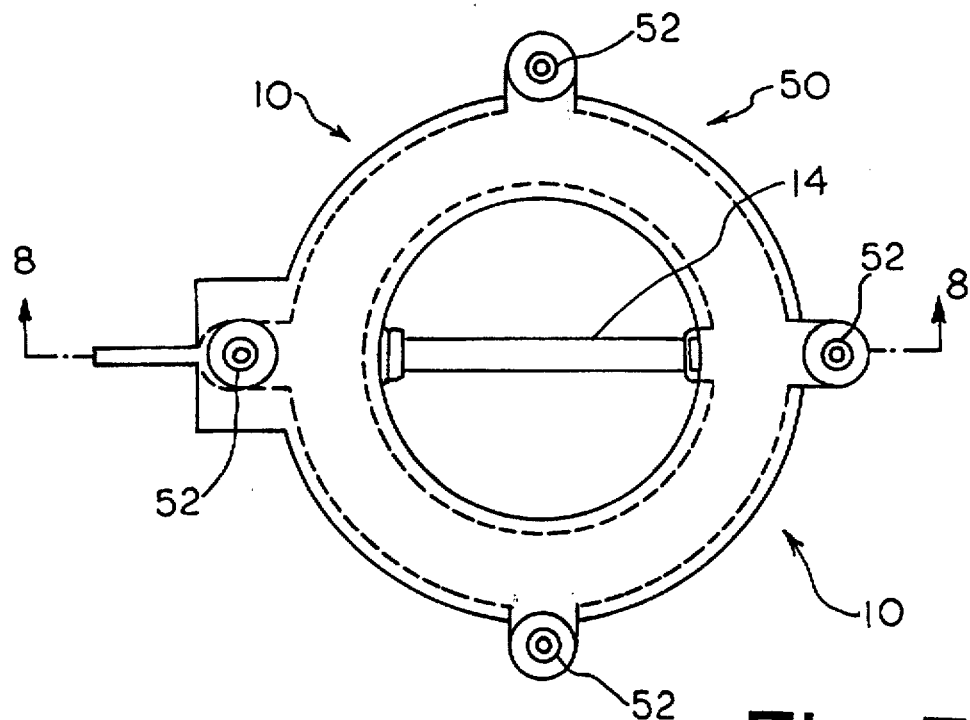
FIG. 7 is a top plan view of a further embodiment of the present invention.
Figure 9:
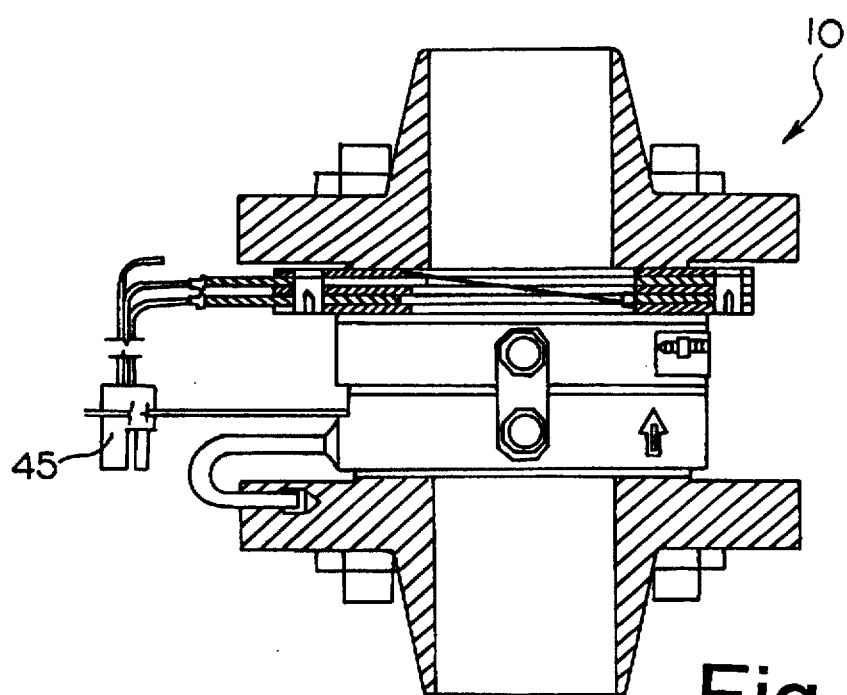
FIG. 9 is a longitudinal cross section of the assembled unit as positioned in a conduit system.
Figure 8:
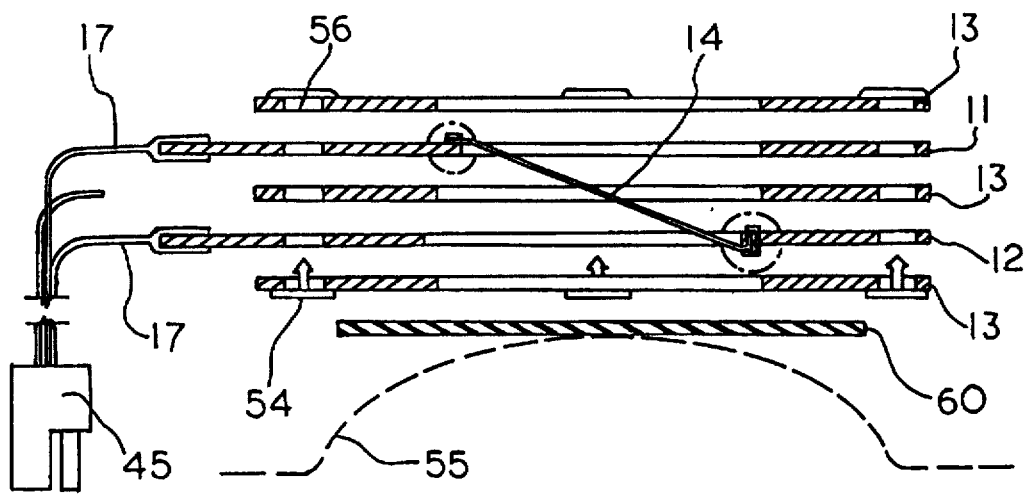
FIG. 8 is an exploded view of the apparatus shown in FIG. 7 and is taken along line 8—8 in FIG. 7.

Referring now to FIGS. 7 through 9, a further embodiment of the present invention is illustrated. Referring to FIG. 7 the assembly 10 includes a connecting assembly 50 for connecting the electrically conductive members and the gaskets in an assembled relationship.

FIG. 8 more clearly illustrates the connecting assembly 50. In a preferred embodiment, the connecting assembly will include a plurality of rivet fasteners 52, which rivet fasteners include a projecting segment 54 and a receiving member 56 for receiving the projection 54. In the example illustrated in FIG. 7 the rivet fasteners 52 are in spaced apart relationship relative to one another around the circumference of the assembly 10. In this manner the members 11, 12 and 13 are connected at separate points, rather than in a continuous relationship about the entire circumference as would be the case with adhesive fastening.

As is illustrated in FIG. 8, the rivet fasteners 52 are positioned above the periphery of the assembly 10 and each of the members 11, 12 and 13 has apertures which register in alignment. The projecting segment 54 and receiving member 56 permit quick connection between each of the members 11, 12 and 13 to provide an assembled unit 10.

Figure 8A:
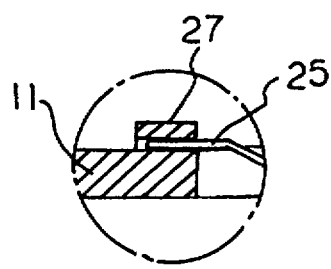
FIG. 8A is an enlarged localized side view of one end of the conductive member shown in FIG. 8.
Figure 8B:
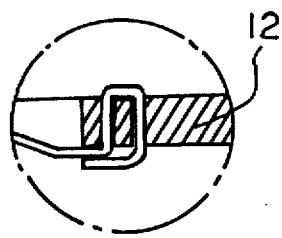
FIG. 8B is an enlarged localized side view of the other end of the electrically conductive member shown in FIG. 8.

FIGS. 8A and 8B illustrate how the electrically conductive member 14 is associated with each of the electrically conductive support members 11 and 12.

In addition to the advantageous fastening assembly 50 discussed herein and above, the assembly 10 will preferably provide a flexible membrane liner 60 for positioning in an adjacent relationship with the electrically conductive member extending between the conductive annular support members 11 and 12. In one form, the membrane liner may comprise of a thin flexible sheet of Teflon or any other suitable film material. Other suitable examples include various plastics. Where the material in the conduit is of a corrosive or otherwise caustic nature, the material of which the membrane may be composed will preferably comprise an inert material.

The linear may be secured to gasket 13 as illustrated in FIG. 8 by any suitable means. Further, the membrane may include means (not shown) for connecting the same to the assembly 10 by the rivets 52 set forth herein above.

A rupture disc, shown in chain line and denoted by numeral 55 in FIG. 8 will have the adjacent relationship as depicted with the liner. In this manner, the membrane 60 acts as a leak guard.

FIG. 9 illustrates a longitudinal cross sectional view of the modified assembly in FIGS. 7 through 8.

It has been found that the use of a flexible liner is attractive since with conventional ruptured disc arrangements, the rupture disc is susceptible to pitting or corrosion. These difficulties eventually lead to small punctures or leaks in the rupture disc. These leaks are not sufficient to cause the disc to burst and therefore provide the observer with an indication that the disc has ruptured and therefore, they pose a particular problem in terms of letting an operator or an observer know when the assembly has been compromised.

By making use of the flexible member in combination with a rupture disc, the flexible member acts as a leak guard and therefore enhances the overall efficiency of the rupture disc assembly.

As those skilled in the art would realize these preferred described details and embodiments can be subjected to substantial variation, modification, change, alteration, and substitution without affecting or modifying the function of the described embodiments. Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. A fluid monitor, comprising:
   first and second electrically conductive annular support members in axial alignment;
   an electrically insulating annular member between said support members;
   a first connecting means on said first support member and a second connecting means on said second support member, said first and second connecting means being diametrically spaced on the support members;
   an electrically conductive member extending between said first and second connecting means and releasably connected thereto;
   electrical connection means on each of said support members; and
   a flexible liner means positioned adjacent said electrically conductive member, said liner means for disengaging said electrically conductive member upon extension of said flexible liner means under fluid pressure.

2. A fluid flow monitor of claim 1, wherein said monitor further includes a rupture disc positioned adjacent said flexible liner means.

3. A fluid flow monitor of claim 2, wherein said flexible liner means comprises a thin flexible sheet material.

4. A fluid flow monitor of claim 3, wherein said flexible sheet material comprises Teflon™.

5. A fluid flow monitor of claim 1, wherein said monitor includes nonelectroconductive fastening means for fastening said annular support members, and said electrically insulating annular member in a fixed axially aligned relationship.

6. A fluid flow monitor of claim 1, comprising said first and second connecting means being attached to tab means extending inward from each of said support members.

7. A fluid flow monitor of claim 1, comprising paired annular gaskets axially aligned with and exterior to said support members.

8. In combination, a rupture disc assembly having monitoring means, comprising:

rupture disc assembly means;

means for mounting said rupture disc assembly means to a pipeline; and monitor means of claim 1 coaxially mounted with said rupture disc assembly means.

9. A fluid flow monitor of claim 8, wherein said monitor includes nonelectroconductive fastening means for fastening said annular support members, and said electrically insulating annular member in a fixed axially aligned relationship.

10. A fluid flow monitor of claim 9, comprising said first and second connecting means being attached to tab means extending inward from each of said support members.

11. A fluid flow monitor of claim 10, comprising paired annular gaskets axially aligned with and exterior to said support members.

* * * * *